United States Patent [19]

Dickey

[11] 4,434,449

[45] Feb. 28, 1984

[54] PROTECTOR UNIT FOR TELECOMMUNICATIONS CIRCUITS

[75] Inventor: Larry W. Dickey, Hackettstown, N.J.

[73] Assignee: Bell Telephone Laboratories, Incorporated, Murray Hill, N.J.

[21] Appl. No.: 383,230

[22] Filed: May 28, 1982

[51] Int. Cl.[3] .............................................. H02H 9/06

[52] U.S. Cl. ...................................... 361/124; 337/34; 361/119

[58] Field of Search ....................... 361/117, 119, 124; 337/17, 18, 20, 28, 29, 34

[56] References Cited

U.S. PATENT DOCUMENTS

| | | | |
|---|---|---|---|
| 2,546,824 | 3/1951 | Koliss | 200/115 |
| 3,573,695 | 4/1971 | Geyer et al. | 337/29 |
| 3,849,750 | 11/1974 | Baumbach et al. | 337/34 X |
| 4,168,515 | 9/1979 | Baumbach | 361/124 |
| 4,215,381 | 7/1980 | Heisinger | 361/124 |
| 4,325,100 | 4/1982 | Baumbach | 361/119 |

*Primary Examiner*—Harry E. Moose, Jr.
*Attorney, Agent, or Firm*—S. M. Gurey

[57] ABSTRACT

A protector unit (30) for protecting tip-and-ring conductors of a telephone loop includes a pair of protector assemblies (40–40') which are supported within a common housing 932). A voltage protection subassembly (42) is connected electrically to a ground subassembly (44) for causing current associated with excessive voltage surges to be conducted to ground. Each protector assembly includes a heat coil subassembly (50) mounted on a dielectric half-base (51), together with a central office pin (57). The heat coil subassembly includes a line pin (61), an eyelet (62), disposed concentrically about the line pin and releasably secured to one end of the line pin in an initial position by a fusible bonding material, and a resistance wire (69), wound about the hub of the eyelet. One end of the wire is welded to the eyelet, and the other end is welded to the central office pin to establish a direct current path between the line pin and the central office pin. The two base halves and the components disposed thereon are held in mated position theretogether by the protector housing. A spring (43) between a cup (93) of the voltage protector subassembly and the housing maintains the voltage protection subassembly in engagement with the eyelet. Also, the spring is effective when current flow exceeds a predetermined level that is sufficient to cause the fusible bonding material to melt to cause the eyelet to be moved to a position where it engages a portion (86) of the grounding subassembly to establish a fault current path to ground potential.

4 Claims, 29 Drawing Figures

FIG. 11
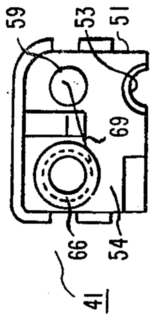
FIG. 9
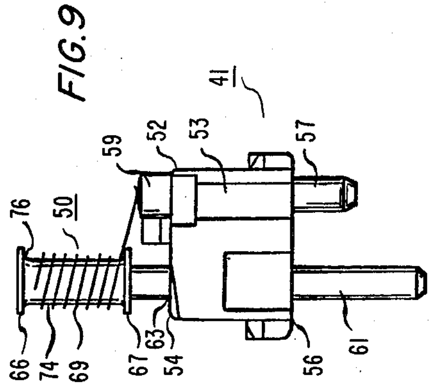
FIG. 10
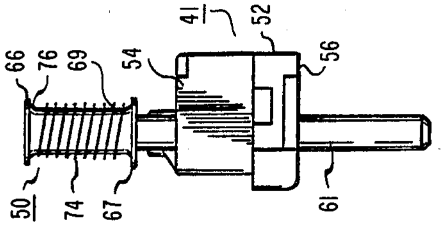
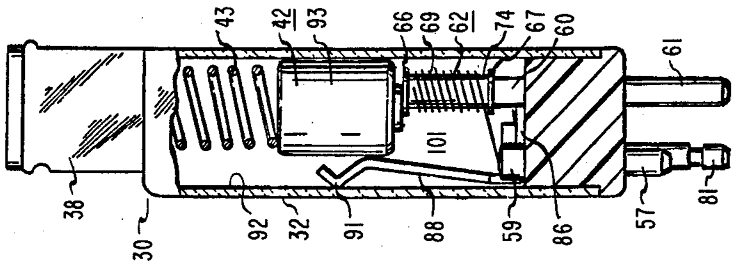
FIG. 8

PROTECTOR UNIT FOR TELECOMMUNICATIONS CIRCUITS

BACKGROUND OF THE INVENTION

1. Field of the Invention

This invention relates to electrical protective devices. More particularly, it relates to devices for protecting communications circuits against excessive voltage surges and excessive currents.

2. Description of the Prior Art

In telephone engineering, it is usual practice to provide protectors at central offices for each incoming line. These protectors, which may be termed units or modules, combine protection against excessive voltages resulting from lightning, for example, with protection against sneak currents. Sneak currents are not strong enough to do any damage if they flow briefly, but may generate enough heat to char conductor insulation and do other damage if allowed to persist. The sneak currents are produced by voltages of relatively low magnitude as compared to the excessive voltages mentioned hereinabove and usually result from accidental interference between telephone lines and adjacent power lines.

Protection of a telephone line against excessive voltage is usually provided by a so-called spark-gap protector which generally includes a pair of spaced carbon electrodes or a gaseous discharge device. One of the electrodes is usually connected to ground, and the other is usually connected to the incoming telephone line. Should a high voltage be impressed on the line, it will bridge the space or gap between the electrodes and cause current to flow to ground, thus bypassing sensitive equipment which is associated with the line.

The second type of protection is commonly provided by a device that is referred to as a heat coil. The heat coil includes a coil of small gauge, high resistance wire which is wound on a metal sleeve inside of which a contact pin is held in a predetermined position by a fusible bonding material such as solder, for example. Should excessive currents occur on the line and persist, sufficient heat will be generated by the coil of wire to melt the solder and release the pin. A spring is usually provided which urges the released pin into electrical contact with a source of ground potential to ground the line and protect sensitive line equipment.

A protector assembly of this general type is disclosed in U.S. Pat. No. 2,546,824, which was issued to P. P. Koliss on Mar. 27, 1951. A contact pin of a heat coil subassembly protrudes into a bore that extends through one of two carbon block electrodes of the spark-gap protector and is releasably held in a sleeve by a solder joint. It includes a pair of springs, one of which retains the elements of the assembly in abutting relation. When the pin is released by current build-up in the heat coil that melts the solder joint, the other spring urges the contact pin through the one carbon electrode into engagement with the other electrode which is connected to a source of ground potential.

Inasmuch as a ring conductor and a tip conductor are associated with each telephone station apparatus, each telephone line requires two protector assemblies. A telephone circuit protector unit, shown in J. B. Geyer et al., U.S. Pat. No. 3,573,695, which issued on Apr. 6, 1971, and which is incorporated by reference hereinto, includes two protector assemblies enclosed in a single insulative housing to save space, to protect the assemblies from dust, and to facilitate installation. Each protector assembly includes a spark-gap subassembly, having spaced carbon blocks, for excessive voltages, and a heat coil subassembly for excessive currents. The spark-gap and heat coil subassemblies are held in abutting-aligned relation by a single spring which is part of the normal transmission circuit. The spring also serves to propel a pin of the heat coil subassembly into engagement with a grounding circuit, which includes one of the carbon blocks, during the passage of excessive currents through the heat coil. In Geyer et al., the axis of each heat coil pin is aligned axially with the axis of its associated carbon blocks.

While units such as those described hereinabove have proved very useful in protecting telephone circuits from excessive voltages and currents, efforts have been made to introduce improvements. For example, to complete a fault current path to ground, the pin in the heat coil subassembly must be brought into contact with a carbon block in the spark-gap protector subassembly. This causes excessive heating of the spark-gap subassembly which becomes part of the fault path. Heat build-up in the carbon blocks of the spark-gap subassembly is commonplace because of their relatively high resistance. A further disadvantage is that the physical arrangement of the heat coil subassembly utilizes excessive space within the protector module. This, together with the extension of a contact pin through the voltage protection portions of the protector, has precluded the use of gaseous discharge devices in place of carbon blocks. Gaseous discharge devices are desirable because of their longer lives and because they afford better control of the breakdown voltage. Further, the need for recesses in the carbon blocks prevents heat shielding of these elements. Because the carbon blocks are provided with recesses, oftentimes, particles which become dislodged drop into and short the spark-gap. As a result, normal spark-gap-type operation may be precluded.

These last-mentioned problems have been overcome by a protector unit shown in U.S. Pat. No. 4,215,381, which issued on July 29, 1980, to R. F. Heisinger, and which is incorporated by reference hereinto. The unit includes a heat coil subassembly for sensing excessive currents and a voltage surge limiter assembly which is axially aligned with the heat coil subassembly for conducting excessive voltages through a grounding subassembly to ground.

In the Heisinger arrangement, gaseous discharge devices may be used inasmuch as the voltage protection portion of the protector is taken out of the fault circuit. When sufficient heat is transferred to the heat coil subassembly such as by a current fault, a fusible alloy melts to allow a spring to cause a heat coil flange to move and touch a laterally projecting tab of a ground terminal assembly. This creates an electrical path external to the voltage protector subassembly through to the ground terminal assembly. If a prolonged voltage surge occurs, there is an arcing over in the voltage surge limiter assembly, the fusible alloy is melted, and the spring moves the heat coil flange plate as before.

Although the Heisinger protector unit overcomes the problem of prior art arrangements, which precluded the use of gaseous discharge devices for voltage surge protection, it continues to use a spring as part of the normal and fault current circuits. Since the spring moves slidably, insulating sleeves are disposed about the spring to prevent shorting. At times, the presence of the spring in the talk circuit results in noise on the line.

A protector unit in which the spring is not in the talk circuit is disclosed in U.S. Pat. No. 4,168,515, which issued on Sept. 18, 1979, to B. W. Baumbach. That unit includes two heat coil subassemblies which are, together with the line pins, individually mounted on dielectric sub-bases. Both sub-bases are supported by a separate main base structure of the protector. The ends of the heat coil are welded to conductive plates to which the line pins are staked, the windings of the coil being directly in the line circuit. During over-current conditions, a fusible alloy is melted by the heat coil causing a conductive cup to move into engagement with a conductive plate that is connected to a line pin, thereby forming a direct metallic shunt to ground. In order, however, for the protector components to fit within a standard-sized housing, which is necessary for interchangeability with other protector units, a thin main base supports the two sub-bases. Such a thin base provides less support for the line pins. Furthermore, the local side stresses imparted on the holes within the main base may result in their permanent deformation and pin misalignment.

A relatively simple protector device having a minimum number of components, and in which there is no spring in the talk circuit, is the subject matter of U.S. patent application, Ser. No. 383,385, filed on even date herewith by J. L. Chapman, P. S. Nelson, and T. A. LaValle. In this protector assembly, current protection is effected by a heat coil subassembly which includes a sleeve disposed concentrically about an entension of the line pin through the supporting dielectric protector base. This sleeve is releasably secured to the line pin by a fusible bonding material and has convolutions of wire wrapped thereabout. One end of the resistance wire is welded to one end of the sleeve, which engages a voltage protection subassembly. The other end of the wire is welded to the central office pin mounted through the base.

In manufacturing protector assemblies of this type, the convolutions of wire cannot be wound around the heat coil sleeve prior to being disposed on the line pin. Since one end of the wire must be welded to the central office pin on the base, a free end of wire would have to be left on a prewound sleeve, which would be difficult to mechanically locate for welding to the pin. Furthermore, a nonfixed wire-wrapped sleeve would tend to unwind, leaving air gaps, which would change the heat transfer to the sleeve. Accordingly, mechanical assembly is best effected by affixing one end of the wire to the sleeve, winding the wire thereon, and affixing the other end of the wire to the central office pin. Difficulty arises, however, in automechanically implementing such procedure for manufacturing a protector unit which includes the standard two protector assemblies necessary for individually protecting the tip-and-ring conductors of a telephone circuit. Because of the close proximity of the two heat coil sleeves, the machine operations of welding and wire-wrapping would be extremely cumbersome.

SUMMARY OF THE INVENTION

The foregoing problems have been overcome by the protector unit of this invention. The protector unit includes a dielectric housing for supporting two protector assemblies and a grounding subassembly that is attached to connect each assembly to a source of ground potential when excessive voltage increases and excessive current increases appear in a circuit having two conductors such as the tip-and-ring conductors of a telephone circuit. Two voltage protection subassemblies are electrically connected to the grounding subassembly for conducting current associated with excessive voltage surges on either conductor to ground potential. Two heat coil subassemblies divert excessive current increases on either conductor to the grounding subassembly. Each heat coil subassembly is mounted on a half-base which also supports an input and output pair of conductive elements associated with one of the conductors. The two half-bases are held in mated position theretogether by the dielectric housing. Each heat coil subassembly includes a sleeve having resistance wire wrapped thereabout which is directly in series with the input and output conductive elements on the half-base. In the preferred embodiment of the invention, the sleeve of each heat coil subassembly is disposed concentrically about the input conductive element on its associated base half and releasably secured thereto by a fusible bonding material. One end of the resistance wire is bonded to one end of the sleeve, and the other end of the wire is bonded to the output conductive element on the base half. Voltage protection subassemblies are held in engagement with the heat coils by springs interposed between the voltage protection subassemblies and the dielectric housing. When the current flow through the resistance wire of either heat coil is above a predetermined level, sufficient heat is transferred to the sleeve to melt the fusible bonding material. This permits the spring to cause the sleeve to move along the input conductive element to engage the grounding subassembly and provide a current path from the input conductive element to the source of ground potential.

In the protector unit of this invention, the heat coils are directly in series with the current flow in each conductor of the protected circuit, and the springs are removed from these current paths, thereby eliminating potential sources of noise in the line. Advantageously, by disposing the wire-wrapped sleeves of each heat coil assembly on a separate half-base, the mechanical steps of winding the heat coils and bonding the ends of the resistance wire to the conductive elements and the sleeve, can be readily automechanized without the physical interference of an adjacent heat coil subassembly.

BRIEF DESCRIPTION OF THE DRAWING

Other features of the present invention will be more readily understood from the following Detailed Description of specific embodiments thereof when read in conjunction with accompanying drawings, in which:

FIGS. 2A and 2B are perspective views of a protector unit of this invention;

FIG. 3 is an exploded perspective view of the electrical protective device of this invention;

FIG. 8 is a side elevational view of the device of FIG. 2 partially in section;

FIG. 9 is a front elevational view of a heat coil subassembly and half-base of the protector unit of this invention;

FIG. 10 is a side elevational view of the heat coil subassembly and half-base of FIG. 9;

FIG. 11 is a plan view of a portion of the half-base of the heat coil subassembly of FIG. 9;

DETAILED DESCRIPTION

Figure 1:
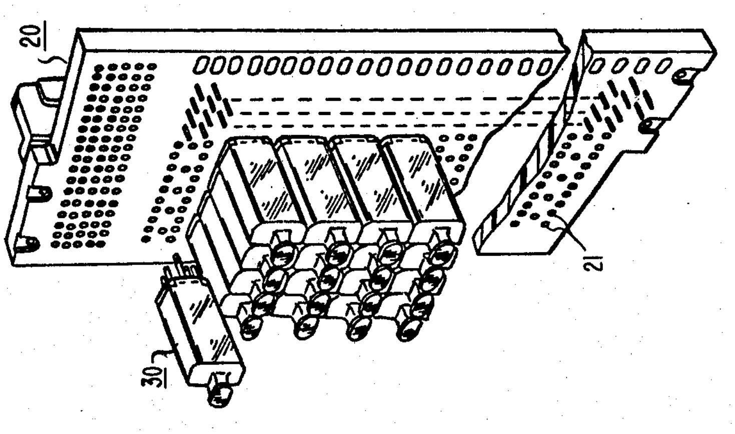
FIG. 1 is a perspective view of an arrangement for mounting a plurality of electrical protective devices of this invention.

Referring now to FIG. 1, there is shown a panel which is designated generally by the numeral 20, and which has a plurality of sockets 21—21 therein for receiving a plurality of pins projecting from an array of circuit protector units, designated generally by the numerals 30—30. It should be apparent that since the panels 20—20 are existing, the holes for receiving the pins of protector units are established. Accordingly, any protector unit which is to be used therewith must have its terminal pins aligned with those holes.

Referring now to FIGS. 2–6 of the drawings, there is illustrated a preferred embodiment of the protector unit of this invention. A plastic housing 32 is shown with a base subassembly 34 which is snap-fastened thereto by tangs 36—36 (see FIG. 2A) on the base which are received in two pairs of slots 37—37 in the housing. As can be seen in the drawings, a finger grip 38 is provided adjacent to a closed end of the housing.

Figures 2, 2A, 3:
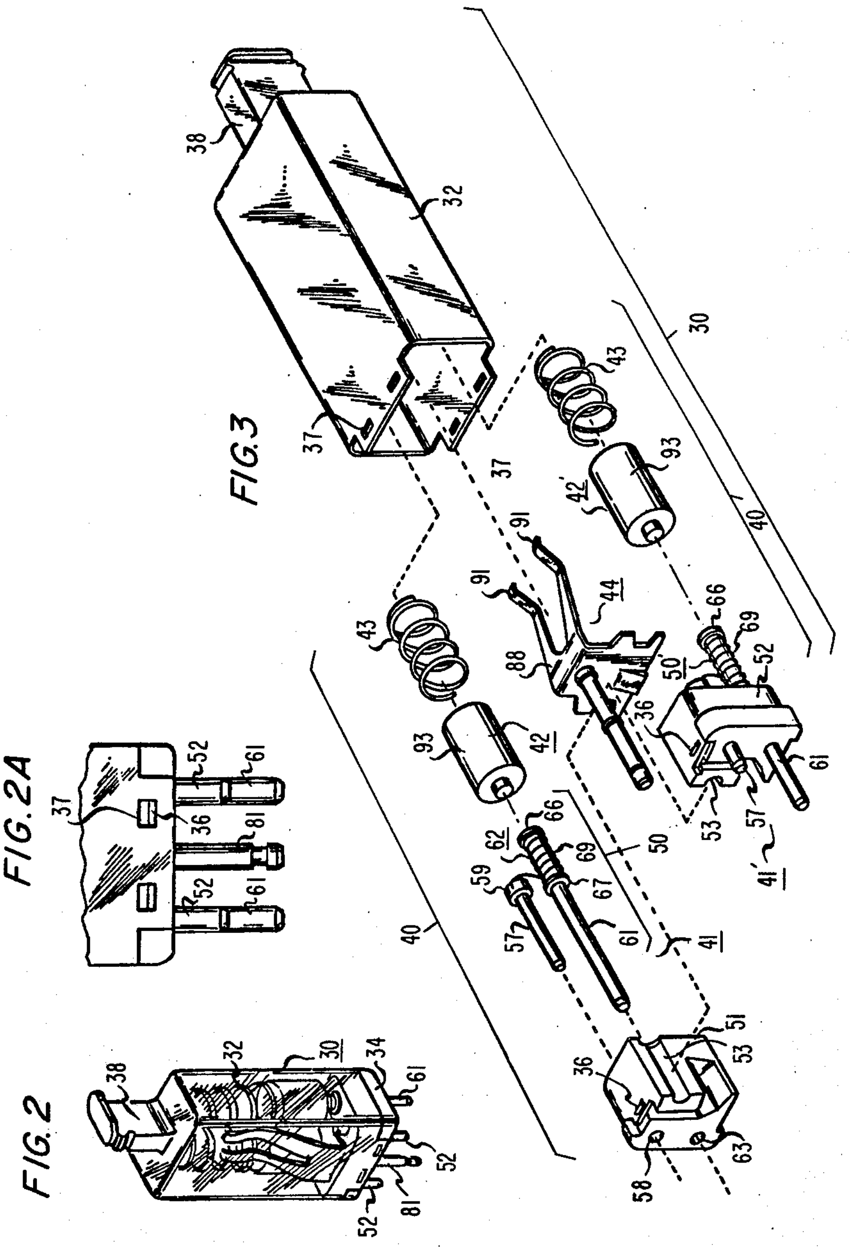
Figure 7:
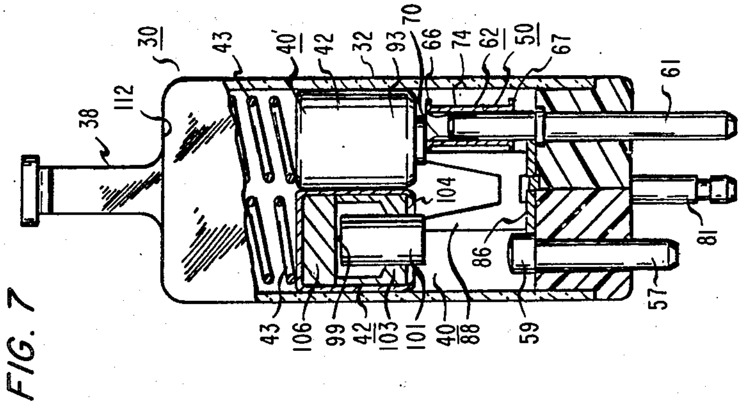
FIG. 7 is a front elevational view partially in section of the device of FIG. 2.
Figure 5:
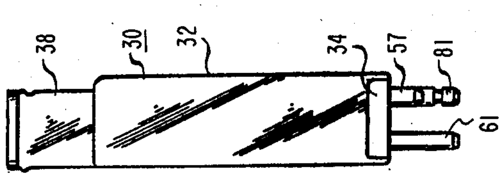
FIG. 5 is a side elevational view of the device of FIG. 2.
Figure 6:
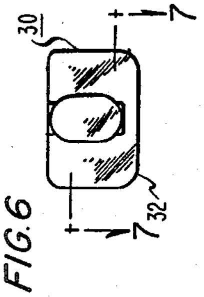
FIG. 6 is a plan view of the device shown in FIG. 4.
Figure 4:
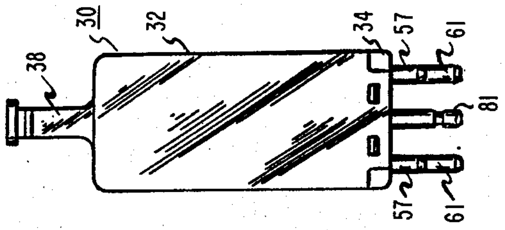
FIG. 4 is a front elevational view of the device of FIG. 2.

As can be seen in FIGS. 3 and 7, a pair of protector assemblies, designated generally by the numerals 40 and 40′, are enclosed in the housing 32. One of the protector assemblies provides protection for a ring conductor, and the other provides protection for a tip conductor of an associated telephone circuit (not shown). But for base portions of each, the protector assemblies 40 and 40′ are structurally identical to each other. Therefore, but for the base portions of each, the same numerals will be used for corresponding parts of the two protector assemblies with the general designation of subassemblies for one having a primed superscript.

Referring particularly to FIG. 3, it can be seen that each protector assembly 40 includes a current overload or protection subassembly which is designated generally by the numeral 41, a voltage protection subassembly which is designated generally by the numeral 42, and a compression spring 43. The voltage protection subassembly 42 is sometimes referred to as a voltage surge limiter subassembly. The protector unit 30 also includes a grounding subassembly which is designated generally by the numeral 44, and which is common to both assemblies 40 and 40′.

The current protection subassembly 41 of the protector assembly 40 includes a current responsive portion 50 (see FIG. 3) which is generally referred to as a heat coil subassembly. The heat coil subassembly 50 is mounted in a left-hand base portion 51, as viewed in FIG. 3, and the heat coil subassembly 50′ is mounted in a right-hand base portion 52. The left-hand and right-hand portions 51 and 52, which together comprise the base 34, are mirror images of each other and, in a preferred embodiment, each is made of a plastic insulating material such as polybutylene terephthalate (PBT). Each base half 51 and 52 (see FIGS. 9–11) also includes a semi-cylindrical passageway 53 formed from a surface 54 to a lower surface 56 thereof. This passageway 53 in one base half is designed to cooperate with the passageway in the other base half when the two are mated together to form the base subassembly 34.

Figure 12:
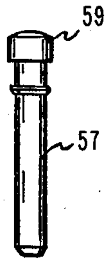
FIG. 12 is an elevational view of a central office pin.

Each portion of the base subassembly 34 supports first and second electrical contact elements which form part of the normal circuit current path. One of these is a central office pin 57 (see FIG. 12) which is mounted in an interference fit in a bore 58 in each one of the base portions. A headed portion 59 of each central office pin 57 extends above the surface 54 of each base half.

Figure 13:
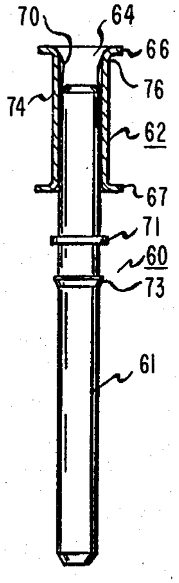
FIG. 13 is an elevational view of a pin-eyelet assembly which comprises a portion of the heat coil subassembly of FIG. 9.

Each heat coil subassembly includes a pin-eyelet subassembly (see FIG. 13). The input to each protector assembly 40—40′ of the protector unit 30 is through the pin-eyelet 60 subassembly. The pin-eyelet subassembly 60 includes a line pin 61, which is received in an interference fit in a bore 63 in the base half 51 (see FIG. 9).

The pin-eyelet subassembly 60 also includes an eyelet 62. The eyelet 62 has the configuration of a sleeve or spool, and includes a central passageway 64 and two flanges 66 and 67, and is designed to hold a plurality of convolutions of a resistance wire 69 thereon. The upper flange prevents any jamming of the heat coil subassembly 50 between the voltage protection subassembly 42 and the housing 32.

The eyelet 62 is secured in a first position to one end of the line pin 61 by means of a fusible bonding material 70 (see FIGS. 7 and 13) such as solder, for example, which has a predetermined melting point. The line pin 61 of the pin-eyelet subassembly 60 also includes a flange 71 and a rib 73, which are spaced between the lower end of the line pin and the lower flange 67 of the eyelet.

The wire 69, which is wound about the hub of the eyelet 62, is made from an alloy such as nichrome which, in a preferred embodiment, is covered with nylon insulation having a wall thickness of 0.008 cm. In the preferred embodiment, the wire 69 is such that its resistance between the line pin 61 and the central office pin 57 is not greater than 4 ohms. One end of the wire 69 is welded to a hub 74 of the eyelet adjacent to an end 76, and an unwound trailing end is welded to the head 59 of the central office pin 57 (see FIG. 9). The eyelet 62 is made of a metallic material, since it is a part of the loop circuit. The wire 69 is insulated, since it is wound on the metallic hub 74 of the eyelet with its convolutions generally touching one another.

A normal circuit path for the current is from the line pin 61 through the sleeve 62, through the wire 69 of the protector assembly 30, and out through the central office pin 57. When there is a current overload, the circuit through the line pin 61 into the metal eyelet 62 and through the wire 69 to the central office pin 57 causes the temperature of the wire to increase. The increased temperature is sufficient to cause the fusible alloy that bonds the eyelet hub 74 to the pin 61 to melt and permit relative movement between the eyelet and the pin.

It should be understood that while an eyelet is used in the preferred embodiment, other equivalents could be used. For example, an unflanged sleeve having a passageway therethrough for receiving the line pin 61, could be used. Moreover, only the ends of the sleeve or the eyelet need be conductive with one end of the insulated resistance wire 69 being bonded to one end of the sleeve and with the other end bonded to the headed end of the central office pin 57.

Other arrangements within the scope of this invention are also possible for the heat coil assembly. For example, an eyelet having conductive flanges and a nonconductive hub could be used. The conductive flanges would be bonded to the line pin 61 with the fusible alloy. Uninsulated wire could be wound on the nonconductive hub with the convolutions spaced apart with one end of the wire bonded to a flange and the other linear trailing end welded to the head of the central office pin as before. As the temperature of wire increases, the hub, which could be some thermally conductive material, will transmit the heat energy to the fusible alloy to melt it and allow operation of the heat coil as before.

The pin-eyelet assembly 60 is mounted in an interference fit in the bore 63 of the heat coil base 51 (see FIGS. 9–11) such that the lower flange 67 of each eyelet 62 is spaced above the top surface of the base. Moreover, the flange 71 and the rib 73 of each line pin 61 are received within the base in order to cause the line pin to be able to resist substantial forces which may be applied axially thereof.

Advantageously, the rib 73 about each of the line pins 61—61 causes an interference fit between the plastic of the base half 51 and the pin which is able to resist the force of about five pounds. Such a force may be generated by plugging a protector unit 30 into the central office panel 20. Moreover, the shoulder 71, formed on each of the line pins 61—61, is adapted to resist the thrust imparted to the pin assemblies generated by other portions of the unit 30. The rib is required to resist the pushing thrust which is in an opposite direction to that experienced by the shoulder 73.

Unlike prior art protector assemblies, the line pin 61 of the protector assembly 40 of this invention for a conductor of each circuit forms a portion of the heat coil portion 50 current protection subassembly 41. This can be seen best by comparing FIGS. 14A and 14B. In FIG. 14A is depicted a prior art protector module which includes a heat coil portion 75, a line pin subassembly 76, and a ground subassembly 77, and the voltage protection subassembly 42. As can be seen in FIG. 14A, the heat coil subassembly 75 is aligned with the voltage protector subassembly 42, but is offset from the line pin 113. In the protector assembly 40 of this invention (see FIG. 14B), the line pin 61 is aligned with the heat coil, but is offset from the voltage protector subassembly 42.

Figure 17:
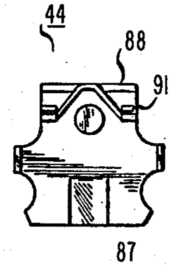
FIG. 17 is a plan view of the ground spring assembly of FIG. 15.
Figure 15:
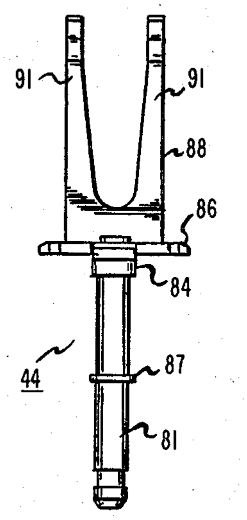
FIG. 15 is a front elevational view of a ground spring assembly of the device of FIG. 2.
Figure 16:
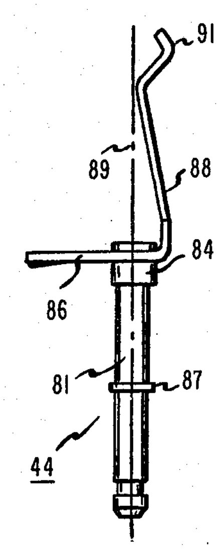
FIG. 16 is a side elevational view of a ground spring assembly of FIG. 12.
Figures 18, 21:
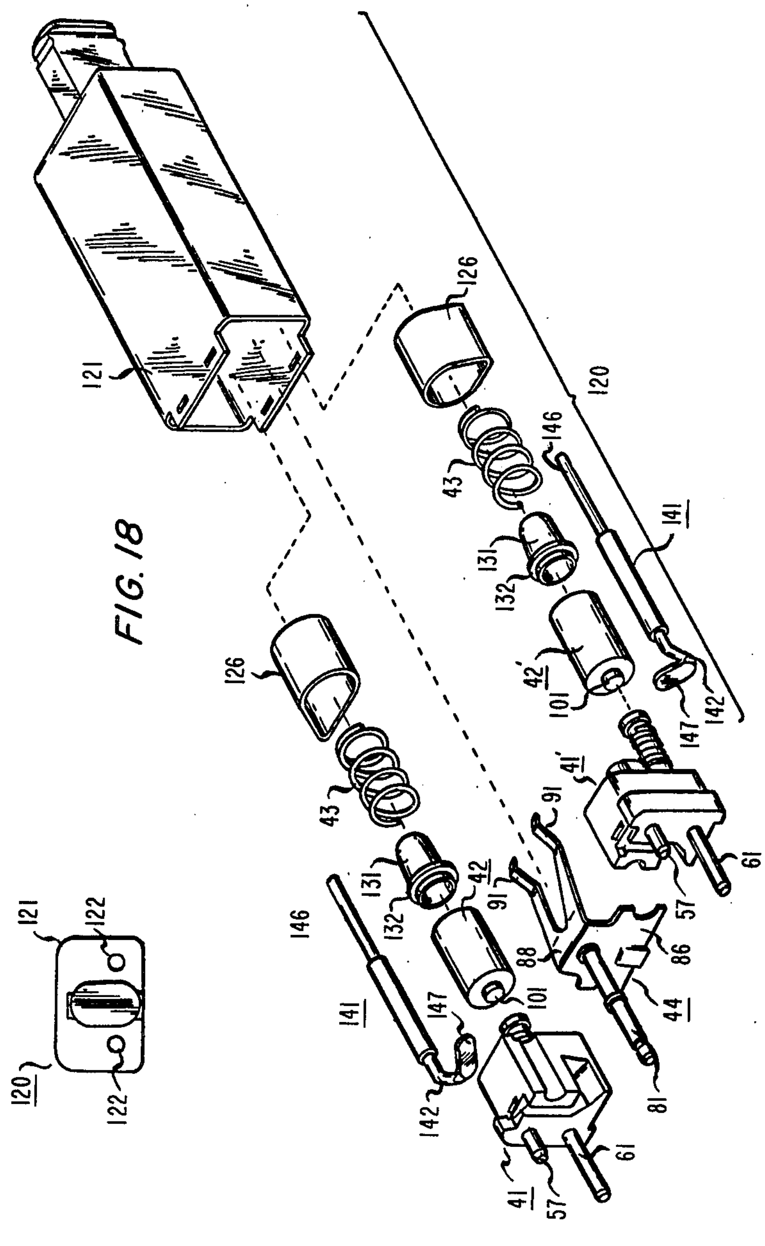
FIG. 18 is an exploded perspective view of an alternative embodiment of this invention.
FIGS. 19–21 are elevational views and plans of the alternate embodiment of the protective device of this invention which includes facilities for engaging test probes.

When the right-hand and the left-hand base assemblies 51 and 52, respectively, are mated together to form the base 34, the semi-cylindrical passageways 53—53 are brought together in order to form a cylindrical passageway (see FIG. 7) for receiving a ground pin 81 of the grounding subassembly 44. The grounding subassembly 44 is shown in FIGS. 15–17 and includes the pin 81 having a shoulder 84 which is riveted to a ground plate 86 which is disposed along the top surface of the mated base halves 51 and 52. When so disposed, portions of the ground plate 86 are received between the lower flange 67 of each one of the pin eyelet assemblies 60—60 and the top surface 54 of the half-bases 51 and 52 (see FIGS. 7–8). The ground spring plate 86 is disposed between the central office pin 57 and the line pin 61 of each half of the base.

The ground pin 81 of the grounding subassembly also includes a shoulder 87 (see FIGS. 15 and 16). The shoulder 87 is surrounded by plastic of the base 34 when the pin 81 is disposed within the passageway 53.

The grounding subassembly 44 also includes a bifurcated portion 88 which extends upwardly from the plate 86 and inwardly toward a centerline 89 of the ground pin 81 (see FIG. 16). As such, each one of upwardly extending fingers, or furcations 91—91, is spaced to one side of the centerline which extends through the ground pin.

The fingers 91—91 are configured to establish electrical contact with the voltage protection portion 42 of the module 30. Referring to FIG. 8, it can be seen that the free ends of the fingers 91—91 are shaped to bear against an inner surface 92 of the housing 32 to insure electrical contact with the voltage overprotection device 42 (see FIG. 8). One finger 91 engages a metallic cup 93 which houses the voltage protection subassembly 42 for the protection assembly 40, and the other finger 91 engages the cup 93 which houses the voltage protection subassembly 42 for the protector assembly 40′.

The voltage protection subassembly 42 of the protector assembly 40 includes a surge limiter having a pair of electrodes, such as a pair of carbon blocks, for example (see FIG. 7). It should be understood that although carbon blocks are shown in the drawings for the voltage overprotection devices, gas tubes, which are well known, also could be used. The cup 93 is positioned such that a lower one of the carbon blocks, as shown in FIG. 7, has its electrode protruding therefrom to engage the upper flange 66 of an associated one of the pin-eyelet assemblies 60. The carbon blocks are received in the cup 93 in a manner to space them apart through a predetermined gap 99. The gap 99 is effective during a voltage protection mode of the protector to cause a sufficiently high voltage to bridge the gap and cause current to flow to ground.

More particularly, the voltage protection subassembly 42 comprises the cup 93, which supports the center carbon electrode 101, or insert which is disposed within a porcelain shell 103. The center carbon electrode extends through an opening 104 in the porcelain shell and protrudes therebeyond a distance of 0.18 cm. The other end of the carbon electrode 101 is spaced a distance of 0.008 cm. from a plane through the open end of the porcelain shell 103. The carbon electrode 101 is bonded to the walls of the opening in the porcelain block. Also disposed within the cup 93, and in engagement with a closed end thereof, is a carbon block 106 which is called a base electrode. The base electrode 106 engages the annular rim of the porcelain shell 103. This causes the base electrode 106 to be spaced from the center electrode 101 a distance of 0.008 cm. This gap, which is thereby established between the center electrode 101 and the base electrode 106, is predetermined in accordance with the level of voltage protection desired.

When a surge of excessive voltage is generated in a telephone line by a lightning strike, for example, the resulting potential enters the current protector through the ring conductor protected by protector assembly 40, the tip conductor protected by the protector assembly 40′, or both conductors. Assuming that the potential enters through the ring conductor, it bridges the associated gap 99 between the center electrode 101 and the base electrode 106 of the protector assembly 40 and is conducted to ground potential through the cup 93 and the ground assembly 44 (see FIG. 14B).

Figure 14B:
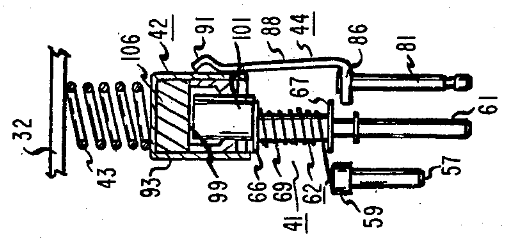
FIGS. 14A and 14B are schematic views of a prior art protector device and the protective device of this invention.
Figure 14A:
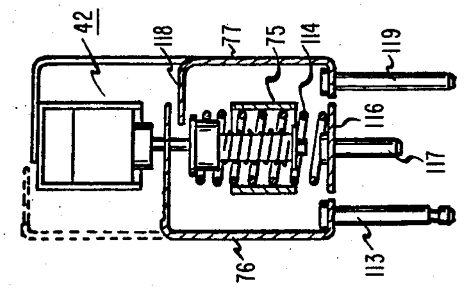
FIG. 14A PRIOR ART

As can be seen in FIGS. 3, 7, and 14B of the drawings, an upper portion of each of the voltage protection subassemblies 42—42 is engaged by a compression spring 43 which also engages an inner portion 112 of the housing 32 of the protector unit. The spring 43 maintains the center electrode 101 in engagement with the eyelet 62. Also, the spring is adapted to cause the eyelet 62 to be moved from an initial, first position on the line pin 61 where it is bonded to the line pin to a second position where a flange 67 of the eyelet engages the base plate 86 of the ground spring assembly 44.

It is significant that each of the line pins 61 comprises a portion of associated heat coil subassembly 50 (see FIGS. 9 and 14B) and is aligned vertically with the eyelet 62 thereof. The centerline of the line pin 61 and of the heat coil is offset 0.22 cm. from the centerline of the voltage protection subassembly 42. This is unlike prior art protector assemblies in which the heat coil assembly is aligned with the centerline of the voltage protection subassembly 42 (see FIG. 14A). As a result, the use of a separate line terminal assembly is obviated. The line pin 61 and eyelet 62 with the winding, of the resistance wire 69, are made in one assembly, thereby reducing the number of parts for the protector assembly 30.

In accordance with the present invention, by mounting a line pin 61, an eyelet 62, and a central office pin 57 for each protector assembly 40 and 41 on separate half-bases 51 and 52, respectively, the winding of resistance wire 69 onto each eyelet 62 can be automechanically implemented. Without the physical interference of an adjacent pin and eyelet assembly, the resistance wire 69 is automechanically welded to one end 76 of eyelet 62, wrapped thereabout, and welded to central office pin 57.

Another advantage of the protector assembly 40 of this invention is that the spring 43 is removed from both the normal talk and fault current paths. It provides a force for urging the eyelet 62 into engagement with the ground plate 86, but is not in the normal current path ior the fault current circuit. The current flow path for the prior art protector module shown in FIG. 14A is up through the pin 113 and terminal 76, through a pressure contact with a pin of the heat coil subassembly 75 and the heat coil winding, through a pressure contact with one end of a spring 114, such as in U.S. Pat. No. 4,215,381, through the spring to another pressure contact with a bottom plate 116, through a bottom plate 116, and out through a central office pin 117. For a voltage fault, the current flows through the voltage protector 42 and out through the ground terminal 77 and a ground pin 119. In the event of current overload, the fusible alloy which bonds the heat coil subassembly 75 to a pin is melted to allow the spring 114 to urge the heat coil flange into engagement with a tab 118 that is connected to the ground pin 119. Since the spring 114 moved, it was necessary to use insulators to prevent a short circuit. Because the spring 43 in the protector assembly 40 of this invention is not in the circuit path, the insulating sleeves are not required.

In the protector unit 30 of this invention, the wire 69 which has convolutions wound on the eyelet 62 of the pin-eyelet 60, functions as a resistance element with the heat being concentrated therein. In a normal operating mode, current flows in through the line pin 61, through the convolutions of the wire 69 wound on the eyelet 62, and out through the central office pin 57. Advantageously, all the connections between these parts which constitute the current path, are connected by welding or by soldering with no pressure contacts as in prior art protector assemblies.

In the event of excessive current, the current path is as before, except that since the current exceeds that of the design load, the unit overheats from the energy generated by the excessive current. The wire 69 generates heat which is transferred to the eyelet 62, and which is sufficient to cause the fusible alloy which bonds the eyelet to the line pin to melt. At that time, the spring 43 becomes effective to move the eyelet 62 from its first position where it is bonded to the pin 61 toward the base to a second position where it engages the plate 86 of the ground plate assembly (see FIG. 14B). The lower flange 67 of the eyelet 62 functions as a shunting element. As a result, the current flows through the line pin 61, the eyelet 62, and directly to the ground plate, substantially shortening the current path from that of prior art protector assemblies.

In the event of a voltage overload, the current moves as before through the line pin 61, through the pin-eyelet assembly 60, through the center electrode 101 of the voltage protector bridging the gap 99, to the base electrode 106, into the cup 93. There is a spark-over between the center and the base electrodes 101 and 106, respectively, of the voltage protector subassembly. Current is conducted through the spring finger 96 to the ground plate 86, and out the ground pin 81, to the source of ground potential. In the event of a sustained voltage surge, sufficient heat is transferred through the eyelet 62 to melt the alloy which holds the eyelet and line pin 61 together. At that time, as before, with the excess current occurrence, the eyelet 62 is caused to be moved along the pin 61, under the urging of the spring 43 to cause the flange 67 of the eyelet to engage the ground plate 86, and establish a shortened current path.

Another embodiment 120 of this invention includes provisions made for direct test access to the tip and ring line conductors of the protector assemblies. Referring more to FIGS. 18-21, it is seen that a housing 121 is provided with two access openings 122—122 adjacent to the handle portion 38. The protector assembly 120 includes two current protection subassemblies 41—41′, two voltage protection subassemblies 42—42′, a grounding subassembly 44, and two springs 43—43.

Figure 22:
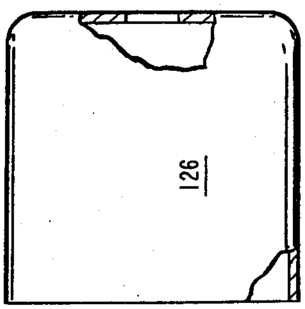
FIG. 22 is an elevational view of a portion of a spring retainer.
Figure 23:
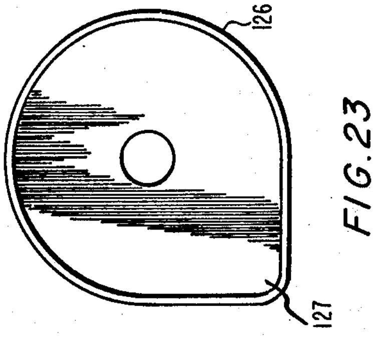
FIG. 23 is a plan view of the retainer shown in FIG. 22.

Additionally, the protector assembly 120 includes two spring retainers 126—126 (see also FIGS. 22-23). The spring retainer 126 is cup-shaped and has an eccentrically disposed portion 127 and is made of a metallic material. In an inner end of each retainer is disposed a spring 43.

Figure 24:
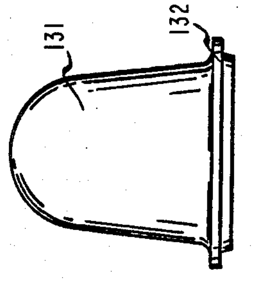
FIG. 24 is an elevational view of an insulator.

The embodiment also includes an insulator 131 (see FIG. 24) which is made of a plastic material and which includes a flange 132. The insulator 131 extends into the spring 43 with the flange 132 preventing its spring from touching the cup 93.

Figure 25:
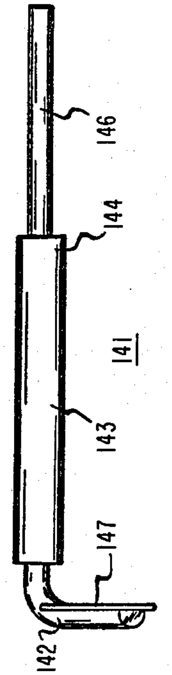
FIGS. 25–27 are views of a strap for use with the embodiment shown in FIG. 18.
Figure 26:
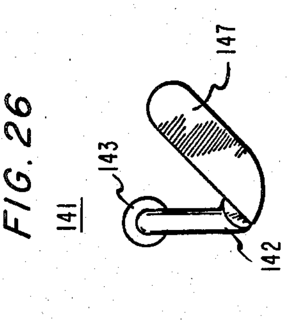
Figure 27:
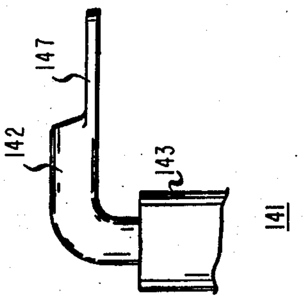

A wire strap 141 (see FIGS. 25–27) is provided to extend each circuit electrically to the vicinity of the access openings 122—122. The strap 141 includes a hooked end portion 142, a portion 143, which is covered with an insulative material 144 and an end portion 146. The strap 141 is adapted to be received in the eccentric portion 127 of the spring retainer 126 with the end portion 146 also engaging the outer diameter face of the compression spring 43. A flattened or swaged portion 147 of the hooked end of the strap 141 extends between the exposed face of the center electrode 101 and the flange 66 of the eyelet 62.

The wire strap 141 is assembled with the modified housing 121, the current protector subassembly 41, the voltage protection subassembly 42, and the ground assembly 44. Insulation is used to cover the portion 143 inasmuch as it extends adjacent to the cup 93. But for the insulation, inadvertent undesired electrical engagement between the cup 93 and the wire strap could occur.

Figure 20:
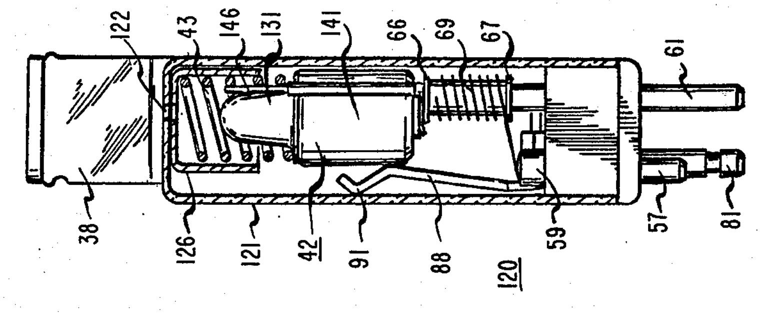
Figure 19:
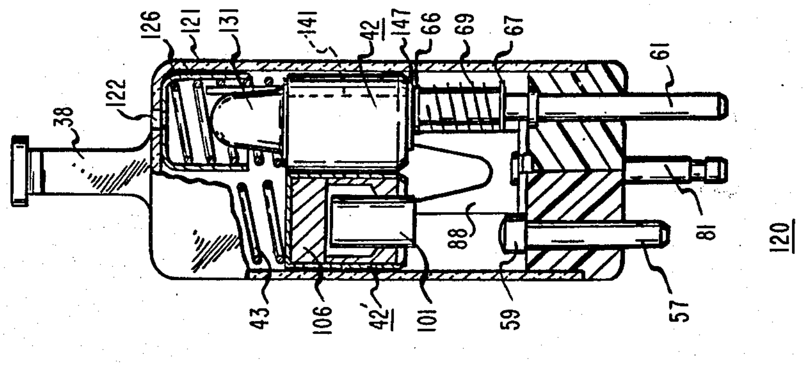

The need for the insulator 131 becomes apparent from a study of the detail assembly of the embodiment 120 which is shown in FIGS. 19–20. One end of the spring 43 is received in, and engages the inner portion of, the cup-shaped retainer 126. The end of the strap 141 is in electrical contact with the retainer 126 and the spring 43. In the embodiment 30 shown in FIG. 3, the spring 43 is electrically connected to the cup 93, and so is at ground potential; however, the cup and the spring are disposed within an insulated housing 32. On the other hand, in the embodiment 120, the strap 141 completes a circuit from the line pin 61 to the spring 43. If the spring 43 were not insulated from the cup 93, which is grounded, the normal current path would be shorted to ground. The insulator 131 removes the spring from its normally idle ground circuit and accommodates it as an idle component in the normal current circuit.

It should be understood that while the preferred embodiment of this invention includes two identical protector assemblies disposed within a single housing, the invention is not so limited. For example, the heat coil and/or voltage protection characteristics on one side need not be identical to those on the other side. The voltage protection can be changed by changing the gap 99, and the current protection can be changed by providing more or less resistance in the wound wire.

Further, the present invention is not limited to protector units in which the sleeves of the heat coil assemblies are fusibly bonded to the line pin, as in the preferred embodiment described hereinabove. Each heat coil subassembly could include a sleeve fusibly bonded to a separate pin which is mounted on an individual half-base.

It is to be understood that the above-described arrangements are simply illustrative of the invention. Other arrangements may be devised by those skilled in the art which will embody the principles of the invention and fall within the spirit and scope thereof.

What is claimed is:

1. An electrical protector unit for protecting a circuit having first and second conductors against excessive current increases and voltage surges, said protector assembly comprises:

a dielectric housing for supporting the unit;

a grounding structure;

a dielectric base structure;

two input and two output conductive elements arranged in pairs and supported in said dielectric base structure;

first and second current responsive means for sensing said excessive current increases in said first and second conductors, respectively, and diverting said excessive current increases to said ground structure, said first and second current-responsive means being supported on said dielectric base structure, each current-responsive means including a resistance wire in direct electrical series with a pair of associated input and output conductive elements; and means for conducting voltage surges in either of said conductors to said ground structure characterized in that said dielectric base structure consists of a first base half and a second base half, each base half supporting a pair of input and output conductive elements and one of said current responsive means, said first and second base halves held in mated position theretogether by said dielectric housing.

2. An electrical protector unit in accordance with claim 1 wherein said first and second base halves are mirror images of each other.

3. An electrical protector unit in accordance with claim 2 wherein said first and second base halves include a semi-cylindrical passage therethrough to form, when said base halves are mated together, a cylindrical passageway for supporting said grounding structure.

4. An electrical protector unit in accordance with claim 3 wherein said first and second base halves include tangs for snap-fastening said base halves to slots in said dielectric housing.

* * * * *

UNITED STATES PATENT AND TRADEMARK OFFICE

CERTIFICATE OF CORRECTION

PATENT NO. : 4,434,449

DATED : February 28, 1984

INVENTOR(S) : Larry W. Dickey

It is certified that error appears in the above—identified patent and that said Letters Patent is hereby corrected as shown below:

In the Abstract, "932)" should read --(32)--. Column 3, line 30, "entension" should read --extension--. Column 9, line 59, "ior" should read --or--.

Signed and Sealed this

*Ninth* Day of *October 1984*

[SEAL]

*Attest:*

GERALD J. MOSSINGHOFF

*Attesting Officer* *Commissioner of Patents and Trademarks*